US012771247B2

(12) United States Patent
Fan et al.

(10) Patent No.: US 12,771,247 B2
(45) Date of Patent: Oct. 20, 2026

(54) CHARGE PUMP CIRCUIT

(71) Applicant: SG MICRO CORP (SUZHOU), Suzhou City (CN)

(72) Inventors: Ziwei Fan, Suzhou City (CN); Xiang Yu, Suzhou City (CN); Fei Xiao, Suzhou City (CN)

(73) Assignee: SG MICRO CORP (SUZHOU), Suzhou City (CN)

( * ) Notice: Subject to any disclaimer, the term of this patent is extended or adjusted under 35 U.S.C. 154(b) by 0 days.

(21) Appl. No.: 19/119,957

(22) PCT Filed: Aug. 31, 2023

(86) PCT No.: PCT/CN2023/116209
§ 371 (c)(1),
(2) Date: Apr. 10, 2025

(87) PCT Pub. No.: WO2024/078180
PCT Pub. Date: Apr. 18, 2024

(65) Prior Publication Data

US 2026/0025070 A1 Jan. 22, 2026

(30) Foreign Application Priority Data

Oct. 12, 2022 (CN) ......................... 202211246010.4

(51) Int. Cl.
*H02M 3/07* (2006.01)

(52) U.S. Cl.
CPC ..................................... *H02M 3/07* (2013.01)

(58) Field of Classification Search
CPC ........ H02M 3/07; H02M 1/0022; H02M 1/08; H02M 3/076

(Continued)

(56) References Cited

U.S. PATENT DOCUMENTS 6,937,487 B1 * 8/2005 Bron ..................... H02M 3/073 363/60
9,866,111 B1 * 1/2018 Zhao ....................... H02M 3/07
(Continued)

FOREIGN PATENT DOCUMENTS

CN 1312493 A 9/2001
CN 101771340 A 7/2010
(Continued)

OTHER PUBLICATIONS

International Search Report for corresponding International Application No. PCT/CN2023/116209, dated Nov. 17, 2023, 5 pages.

*Primary Examiner* — Ryan Jager
(74) *Attorney, Agent, or Firm* — Westman, Champlin & Koehler, P.A.

(57) ABSTRACT

The present disclosure describes a charge pump circuit, comprising a first switch, a second switch and a flying capacitor. The first switch receives driving voltage when the clock signal is at the first level, while the second switch receives driving voltage at the second level. The flying capacitor charges via the first switch and discharges via the second switch to generate the output voltage. When the power supply voltage is lower than the preset output voltage, the driving voltage for the first switch is lower than that for the second switch. The present disclosure adaptively regulates the current-carrying capabilities of the first and second switches in accordance with the magnitude of the power supply voltage to ensure that the voltage difference across the flying capacitor is less affected by changes in the power supply voltage, thereby enhancing circuit stability.

9 Claims, 2 Drawing Sheets

(58) Field of Classification Search
USPC .......................................................... 327/536
See application file for complete search history.

(56) References Cited

U.S. PATENT DOCUMENTS

| | | | | | |
|---|---|---|---|---|---|
| 10,447,153 | B2 * | 10/2019 | Raimar | ................... | H02M 3/07 |
| 2006/0215428 | A1 * | 9/2006 | Mok | ....................... | H02M 3/07<br>363/59 |
| 2008/0122941 | A1 * | 5/2008 | Kikuchi | .................. | H02M 3/07<br>348/222.1 |
| 2009/0121781 | A1 * | 5/2009 | Oyama | ................... | H02M 3/07<br>327/536 |
| 2010/0164600 | A1 * | 7/2010 | Liu | ......................... | H02M 3/07<br>327/437 |
| 2015/0207404 | A1 * | 7/2015 | Philip | ..................... | H02M 1/44<br>455/73 |

FOREIGN PATENT DOCUMENTS

| | | | |
|---|---|---|---|
| CN | 115798872 | A | 12/2022 |
| CN | 116207977 | A | 6/2023 |

* cited by examiner

CHARGE PUMP CIRCUIT

CROSS-REFERENCE TO RELATED APPLICATIONS

This application is a Section 371 National Stage Application of International Application No. PCT/CN2023/116209, filed on Aug. 31, 2022, entitled "CHARGE PUMP CIRCUIT", and published as WO2024/078180 A1, published Apr. 18, 2024, not in English, which claims priority to a Chinese Patent application No. 202211246010.4 filed on Oct. 12, 2022, the contents of which are incorporated herein by reference in their entireties.

FIELD OF TECHNOLOGY

The present disclosure relates to the field of electronic technology, and more specifically, to a charge pump circuit.

BACKGROUND

A charge pump, also known as a switched-capacitor voltage converter, is a type of converter that utilizes the so-called "rapid" or "pumped" load capacitors to store energy. It can be used to step up or step down the input voltage and can also generate negative voltages. Charge pumps are widely used in power supplies, memory devices, and RF chips. However, conventional charge pump circuits suffer from the problem that the voltage difference across the flying capacitor is significantly affected by changes in the supply voltage due to the different operating states of the charging and discharging switch elements in the circuit.

SUMMARY OF THE DISCLOSURE

In view of the above-mentioned problems, the present disclosure aims to provide a charge pump circuit that addresses the problem of the voltage difference across the flying capacitor being significantly affected by changes in the supply voltage.

According to an embodiment of the present disclosure, a charge pump circuit is provided, comprising:

a first switch, having a control terminal that receives a driving voltage when the clock signal is in a first level state, and a substrate terminal that receives one of a power supply voltage and an output voltage;

a second switch, having a control terminal that receives the driving voltage when the clock signal is in a second level state, and a substrate terminal that receives the power supply voltage;

a flying capacitor, having a first end that receives the power supply voltage via the first switch, and a second end that receives the power supply voltage via the second switch, wherein, when the first switch receives the driving voltage and is turned on, the second switch is turned off, allowing the power supply voltage to charge the flying capacitor, and when the second switch receives the driving voltage and is turned on, the first switch is turned off, allowing the flying capacitor to discharge to generate the output voltage, when the power supply voltage is less than a preset output voltage, the driving voltage provided to the first switch is less than the driving voltage provided to the second switch in at least one cycle of the clock signal.

Optionally, when the power supply voltage is less than the preset output voltage, the substrate terminal of the first switch receives the output voltage; when the power supply voltage is greater than the preset output voltage, the substrate terminal of the first switch receives the power supply voltage.

Optionally, when the power supply voltage is greater than the preset output voltage, the driving voltage provided to the first switch equals the driving voltage provided to the second switch in at least one cycle of the clock signal.

Optionally, the charge pump circuit further comprises:

an adjustment circuit, which provides an offset voltage when the power supply voltage is less than the preset output voltage and the first switch is turned on, and generates an amplified feedback signal in accordance with the output voltage and a reference voltage, and outputs the amplified feedback signal alone or the amplified feedback signal superimposed with the offset voltage as the driving voltage.

Optionally, when the power supply voltage is less than the preset output voltage, the driving voltage provided to the first switch is the amplified feedback signal superimposed with the offset voltage, and the driving voltage provided to the second switch is the amplified feedback signal; when the power supply voltage is greater than the preset output voltage, the driving voltage is the amplified feedback signal.

Optionally, the adjustment circuit comprises:

an offset unit, which provides the offset voltage when the power supply voltage is less than the preset output voltage and the first switch is turned on; and a feedback unit, which generates the amplified feedback signal in accordance with the output voltage and the reference voltage, and outputs the amplified feedback signal alone or the amplified feedback signal superimposed with the offset voltage as the driving voltage, wherein the feedback unit comprises:

a voltage divider, which samples the output voltage to obtain a divided voltage;

an error amplifier, coupled to the voltage divider, which generates the amplified feedback signal in accordance with the divided voltage and the reference voltage; and a buffer, having a first input terminal receiving the amplified feedback signal, a second input terminal being coupled to an output terminal of the buffer, and the output terminal further receiving the offset voltage.

Optionally, the offset unit comprises:

a current source, having a first terminal receiving the power supply voltage; and a third switch and a fourth switch coupled in series between a second terminal of the current source and the output terminal of the buffer, wherein the third switch is turned on when the substrate terminal of the first switch receives the output voltage, and the fourth switch is turned on when the clock signal is in the first level state.

Optionally, the preset output voltage is positively correlated with the reference voltage.

Optionally, the charge pump circuit further comprises:

a fifth switch, having a first terminal being coupled to the second end of the flying capacitor, and a second terminal being grounded;

a sixth switch, having a first terminal being coupled to the first end of the flying capacitor, and a second terminal providing the output voltage; and an output capacitor, being coupled between the output voltage and ground, wherein the fifth switch is turned on when the first switch is turned on, and the sixth switch is turned on when the second switch is turned on.

The charge pump circuit of the present disclosure includes a flying capacitor, an output capacitor, a first switch, and a second switch. The substrate terminal of the first switch receives one of the power supply voltage and the output voltage, while the substrate terminal of the second switch receives the power supply voltage. When the substrate terminal of the first switch receives the output voltage, it can cause a difference in the current-carrying capability between the first and second switches. The present disclosure, when the substrate terminal of the first switch receives the output voltage, adjusts the driving voltage provided to the first switch to be less than that provided to the second switch. This allows the circuit to adaptively regulate the current-carrying capabilities of the first and second switches in accordance with the power supply voltage, ensuring that both switches operate in the saturation region. As a result, the voltage difference across the flying capacitor is less affected by changes in the power supply voltage, leading to a smoother state transition and enhanced circuit stability during power supply voltage variations.

Furthermore, by incorporating an adjustment circuit in the charge pump circuit, an offset voltage is generated and superimposed on the amplified feedback signal when the power supply voltage is less than the preset output voltage and the first switch is provided with the driving voltage. This increases the gate-source voltage of the first switch, thereby enhancing its current-carrying capability. This ensures that both switches operate in the saturation region, minimizing the impact of power supply voltage changes on the voltage difference across the flying capacitor. Consequently, the entire charge pump circuit transitions more smoothly during power supply voltage variations, improving overall circuit stability.

BRIEF DESCRIPTION OF THE DRAWINGS

The above and other objectives, features, and advantages of the present disclosure will become more apparent through the following description with reference to the accompanying drawings, in which.

DETAILED DESCRIPTION OF THE DISCLOSURE

Figure 1A:
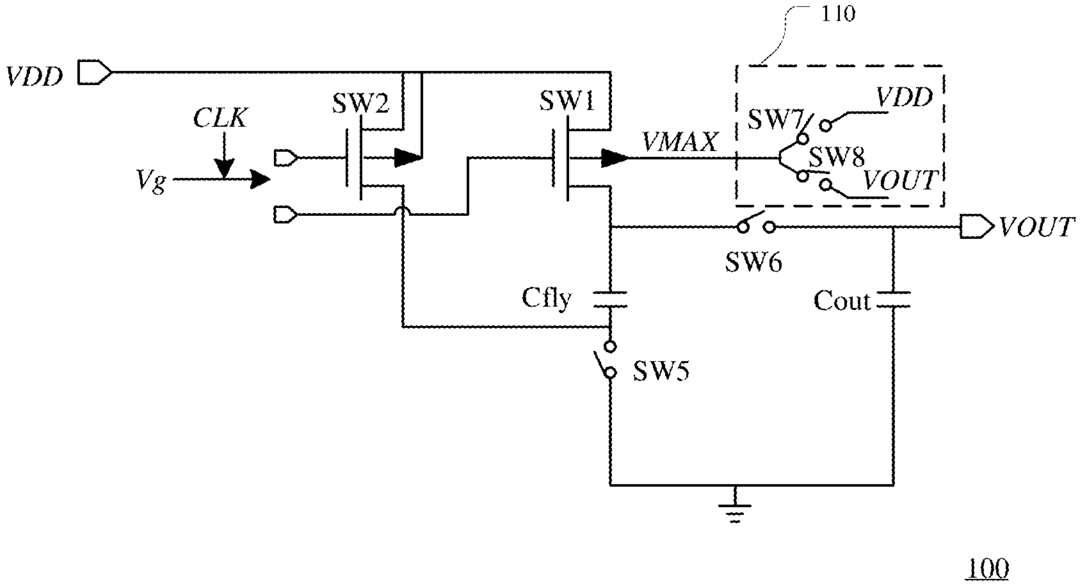
FIG. 1*a* illustrates a structural diagram of a charge pump circuit according to an embodiment of the present disclosure.

The various embodiments of the present disclosure will be described in detail below with reference to the accompanying drawings. In the drawings, the same elements are denoted by the same or similar reference numerals for clarity. It should be understood that the drawings are not drawn to scale.

It should be noted that the term "circuit" as used herein may include one or more combined hardware circuits, programmable circuits, state machine circuits, and/or elements capable of storing instructions executable by programmable circuits. When an element or circuit is said to be "coupled to" another element or "coupled between" two nodes, it may be directly coupled or coupled to the other element, or there may be intermediate elements. Conversely, when an element is said to be "directly coupled to" or "directly coupled to" another element, it means that there are no intermediate elements between them.

Figure 1B:
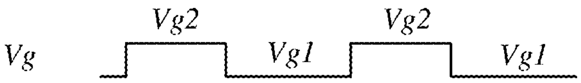
FIG. 1*b* shows a waveform diagram of the driving voltage for the charge pump circuit in FIG. 1*a* when the power supply voltage is less than the preset output voltage.

FIG. 1*a* illustrates a structural diagram of a charge pump circuit according to an embodiment of the present disclosure, and FIG. 1*b* shows a waveform diagram of the driving voltage for the charge pump circuit in FIG. 1*a* when the power supply voltage is less than the preset output voltage.

As shown in FIG. 1*a*, the charge pump circuit 100 includes a flying capacitor Cfly, switches SW1 and SW2. The control terminal of switch SW1 receives the driving voltage Vg when the clock signal CLK is in the first level state. The first terminal of switch SW1 receives the power supply voltage VDD, and the second terminal of switch SW1 is coupled to the first end of the flying capacitor Cfly. The substrate terminal of the first switch SW1 receives one of the power supply voltage VDD and the output voltage VOUT. When the first switch SW1 is turned on, it charges the flying capacitor Cfly with the power supply voltage VDD.

The control terminal of the second switch SW2 receives the driving voltage Vg when the clock signal CLK is in the second level state. The first terminal of the second switch SW2 receives the power supply voltage VDD, and the second terminal of the second switch SW2 is coupled to the second end of the flying capacitor Cfly. The substrate terminal of the second switch SW2 is coupled to its first terminal and receives the power supply voltage VDD. When the second switch SW2 is turned on, it discharges the flying capacitor Cfly to provide the output voltage VOUT. The control terminals of switches SW1 and SW2 alternately receive the driving voltage Vg in accordance with the level state of the clock signal CLK, thereby alternating their on and off states.

In other embodiments, the charge pump circuit 100 further includes switches SW5, SW6, and an output capacitor Cout.

The first terminal of the switch SW5 is coupled to the second end of the flying capacitor Cfly, and the second terminal of the switch SW5 is grounded. The first terminal of switch SW6 is coupled to the first end of the flying capacitor Cfly, and the second terminal of switch SW6 provides the output voltage VOUT and is coupled to one terminal of the output capacitor Cout. The other terminal of the output capacitor Cout is grounded. Furthermore, in the first level state of the clock signal CLK, the charging switch element (switch SW1) receives the driving voltage Vg and turns on, and the switch SW5 also turns on. At this time, the discharging switch elements (switches SW2 and SW6) are turned off, meaning that the charge pump circuit 100 is in the charging phase, with the power supply voltage VDD charging the flying capacitor Cfly. Subsequently, in the second level state of the clock signal CLK, the charging switch elements (switches SW1 and SW5) are turned off, while the discharging switch element (switch SW2) receives the driving voltage Vg and turns on, and switch SW6 also turns on. At this point, the charge pump circuit 100 is in the discharging phase, with the power supply voltage VDD being superimposed on the charging voltage of the flying capacitor Cfly. The above charging and discharging phases are alternately repeated to increase the voltage Vout of the output capacitor Cout above the power supply voltage VDD. The control terminals of the switches SW5 and SW6, for example, receive a logic high level or a logic low level to be turned on or off.

In this embodiment, the switches SW1, SW2, and SW6 are selected from P-type MOSFETs (P-Channel Metal- Oxide-Semiconductor Field-Effect Transistors), while the switch SW5 is selected from an N-type MOSFET (N-Channel Metal-Oxide-Semiconductor Field-Effect Transistor). Furthermore, the first terminals of the switches SW1 and SW2 correspond to the source of the PMOS transistor, the second terminals of the switches SW1 and SW2 correspond to the drain of the PMOS transistor, and the control terminals of the switches SW1 and SW2 correspond to the gate.

The second terminal of the first switch SW1 is coupled to the output voltage Vout via a switch. To prevent the PN junction between the substrate terminal and the second terminal of the first switch SW1 from conducting, the charge pump circuit 100 further includes a selection circuit 110, which is adapted to select one of the output voltage VOUT and the power supply voltage VDD to provide to the substrate terminal of the first switch SW1 in accordance with the power supply voltage VDD and the preset output voltage. The selection circuit 100 includes switches SW7 and SW8. The first terminal of the switch SW7 receives the power supply voltage VDD, and the second terminal of the switch SW7 is coupled to the substrate terminal of the first switch SW1. The first terminal of the switch SW8 receives the output voltage VOUT, and the second terminal of the switch SW8 is coupled to the substrate terminal of the first switch SW1. The control terminals of the switches SW7 and SW8 (not shown in the figure) receive a comparison result between the power supply voltage VDD and the preset output voltage. When the power supply voltage VDD is less than the preset output voltage, switch SW7 is turned off and switch SW8 is turned on, so that the substrate terminal of the first switch SW1 receives the output voltage VOUT. When the power supply voltage VDD is greater than the preset output voltage, the switch SW7 is turned on and the switch SW8 is turned off, so that the substrate terminal of the first switch SW1 receives the power supply voltage VDD. In this embodiment, the types of transistors for switches SW7 and SW8 are different. It should be noted that the types of transistors for the switches SW7 and SW8 can also be the same. Correspondingly, one of the control terminals of the switches SW7 and SW8 receives the comparison result between the power supply voltage VDD and the preset output voltage, while the other receives an inverted version of the comparison result.

Furthermore, when the power supply voltage VDD is greater than the preset output voltage, the voltage difference between the substrate terminal and the first terminal of the first switch SW1 is 0, and the voltage difference between the substrate terminal and the first terminal of the second switch SW2 is also 0. In this case, the switches SW1 and SW2 remain in the saturation region to charge and discharge the flying capacitor Cfly. Ideally, their charging and discharging capabilities are consistent. Under these circumstances, in at least one cycle of the clock signal CLK, the driving voltage Vg has the same voltage value when the clock signal CLK is in the first level state as when it is in the second level state.

Furthermore, when the power supply voltage VDD is less than the preset output voltage, the voltage difference between the substrate terminal and the first terminal of the first switch SW1 is greater than 0, while the voltage difference between the substrate terminal and the first terminal of the second switch SW2 is 0. At this time, the first switch SW1 experiences a substrate bias effect, which increases its threshold voltage VTH and reduces its current-carrying capability. This causes the charge pump circuit 100 to have weaker charging capability than discharging capability for the flying capacitor Cfly. Referring to FIG. 1*b*, when the power supply voltage VDD is less than the preset output voltage, and in at least one cycle of the clock signal CLK, the driving voltage Vg (Vg1) in the first level state of the clock signal CLK is less than the driving voltage Vg (Vg2). in the second level state of the clock signal CLK Since the voltage at the first terminal of both the switches SW1 and SW2 is the power supply voltage VDD, the magnitude of the gate-source voltage of the first switch SW1 when it is turned on (in a low level state) is greater than that of the second switch SW2 when it is turned on (in a low level state). That is, in this embodiment, when the power supply voltage VDD is less than the preset output voltage, the driving voltage Vg provided to the first switch SW1 (Vg1) is reduced so that the magnitude of the gate-source voltage of the first switch SW1 is greater than that of the second switch SW2. This enhances the charging capability of the charge pump circuit 100, thereby maintaining the charge balance of the flying capacitor Cfly. This avoids the voltage difference across the flying capacitor Cfly having steps when the power supply voltage VDD changes, thereby improving the stability of the charge pump circuit 100.

Figure 2:
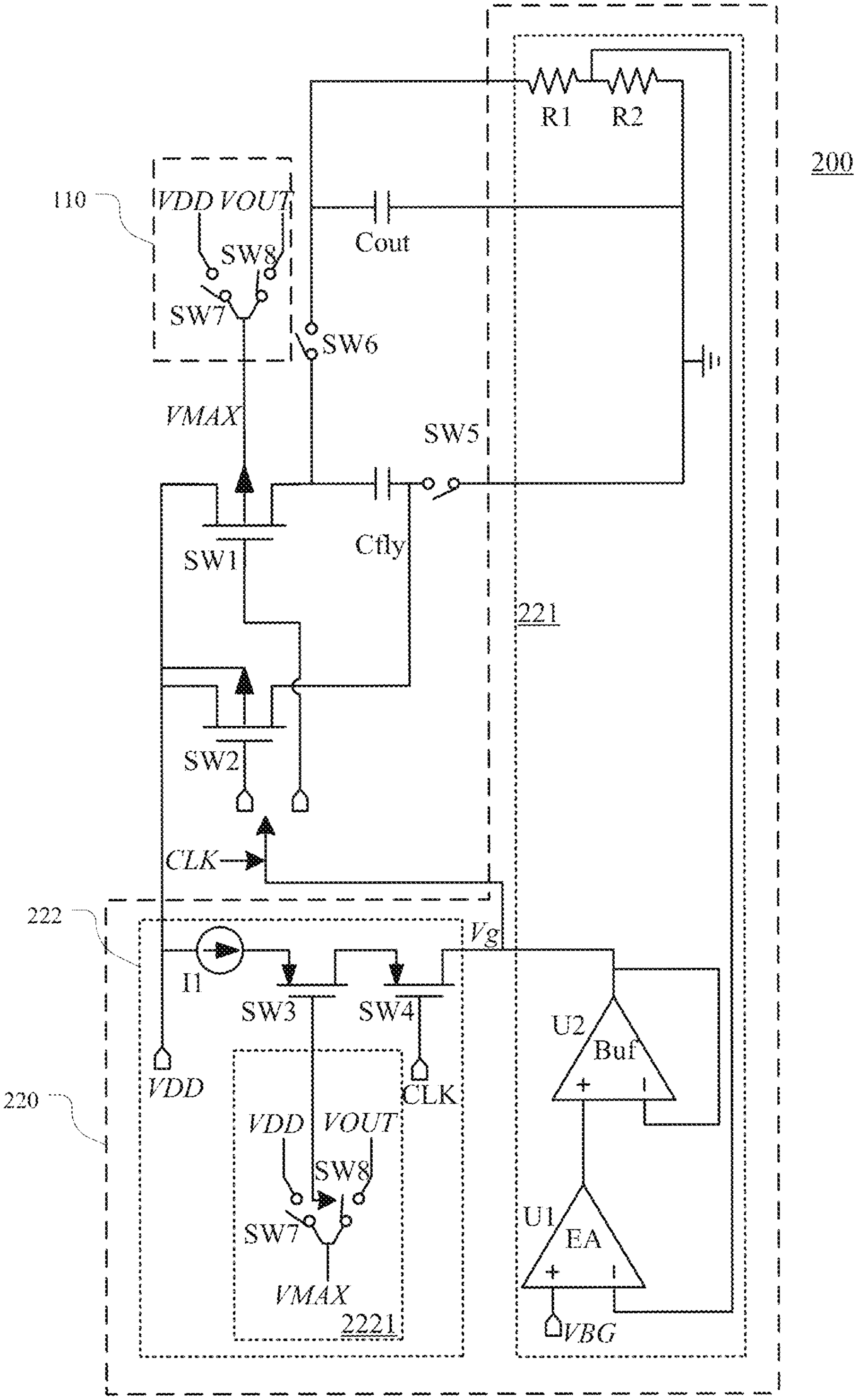
FIG. 2 illustrates another structural diagram of a charge pump circuit according to an embodiment of the present disclosure.

FIG. 2 illustrates another structural diagram of a charge pump circuit according to an embodiment of the present disclosure.

As shown in FIG. 2, the charge pump circuit 200 includes an adjustment circuit 220 in addition to the components of the charge pump circuit 100.

The adjustment circuit 220 is adapted to provide an offset voltage when the substrate terminal of the first switch SW1 receives the output voltage VOUT and the clock signal CLK is in the first level state. It also generates an amplified feedback signal in accordance with the output voltage VOUT and a reference voltage VBG, and outputs the amplified feedback signal alone or the amplified feedback signal superimposed with the offset voltage as the driving voltage Vg. Specifically, when the substrate terminal of the first switch SW1 receives the output voltage VOUT and the clock signal CLK is in the first level state, the driving voltage Vg is the amplified feedback signal superimposed with the offset voltage. When the substrate terminal of the first switch SW1 receives the output voltage VOUT and the clock signal CLK is in the second level state, or when the substrate terminal of the first switch SW1 receives the power supply voltage VDD, the driving voltage Vg is the amplified feedback signal.

Furthermore, the adjustment circuit 220 includes a feedback unit 221 and an offset unit 222.

The feedback unit 221 generates an amplified feedback signal in accordance with the output voltage VOUT and the reference voltage VBG, and outputs the amplified feedback signal alone or the amplified feedback signal superimposed with the offset voltage as the driving voltage Vg. The feedback unit includes a voltage divider, an error amplifier U1, and a buffer U2. The voltage divider samples the output voltage VOUT to obtain a divided voltage, which includes resistors R1 and R2 coupled in parallel across the output capacitor Cout. The first end of resistor R1 receives the output voltage VOUT, the second end of resistor R1 is coupled to the first end of resistor R2 and outputs the divided voltage, and the second end of resistor R2 is grounded. The error amplifier (EA) U1 generates an amplified feedback signal in accordance with the divided voltage and the reference voltage VBG. Specifically, the first input terminal of error amplifier U1 receives the reference voltage VBG, the second input terminal receives the divided voltage, and the output terminal outputs the amplified feedback signal. The buffer U2 has its first input terminal coupled to the output terminal of error amplifier U1 to receive the amplified feedback signal, its second input terminal coupled to its output terminal. The output terminal of the buffer U2 also receives the offset voltage. The preset output voltage is positively correlated with the reference voltage VBG.

The offset unit 222 provides the offset voltage when the substrate terminal of the first switch SW1 receives the output voltage VOUT and the clock signal CLK is in the first level state. The offset unit 222 includes a current source I1, switches SW3 and SW4. The first terminal of current source I1 receives the power supply voltage VDD. The switches SW3 and SW4 are coupled in series between the second terminal of current source I1 and the output terminal of buffer U2. The switch SW3 is turned on when the substrate terminal voltage VMAX of the first switch SW1 is the output voltage VOUT, and is turned off in other cases. The switch SW4 is turned on when the clock signal CLK is in the first level state and turned off when the clock signal CLK is in the second level state. Specifically, the first terminal of the switch SW3 is coupled to the second terminal of current source I1, the second terminal of the switch SW3 is coupled to the first terminal of the switch SW4, and the second terminal of the switch SW4 is coupled to the output terminal of buffer U2. The control terminal of the switch SW4 receives the clock signal CLK. The offset unit 222 also includes a comparison unit 2221, which controls the switch SW3 to be turned on when the switch SW8 in the selection circuit 110 is turned on. For example, the comparison unit 2221 includes a comparison circuit (not shown in the figure). The first input terminal of the comparison circuit is coupled to the first terminal of the switches SW7 and SW8 to receive the substrate terminal voltage VMAX of the first switch SW1, and the second input terminal receives the power supply voltage VDD. The output terminal of the comparison circuit outputs a comparison result. For example, when the substrate terminal voltage VMAX is greater than the power supply voltage VDD, the comparison result is a valid level, thereby turning on the switch SW3; when the substrate terminal voltage VMAX is not greater than the power supply voltage VDD, the comparison result is an invalid level, thereby turning off switch SW3.

The charge pump circuit 200 generates an offset voltage and superimposes it on the amplified feedback signal when the substrate terminal voltage VMAX of the first switch SW1 is greater than the power supply voltage, thereby increasing the magnitude of the gate-source voltage of the first switch SW1 and enhancing its current-carrying capability. This ensures that the switches SW1 and SW2 remain in the saturation region to charge and discharge the flying capacitor Cfly.

The drain-source voltage Vds1 of the first switch SW1 satisfies: Vds1=VDD−Vfly. The drain-source voltage Vds2 of the second switch SW2 satisfies: Vds2=VDD−(VOUT−Vfly). Wherein, Vfly is the voltage difference across the flying capacitor Cfly. When the charging and discharging capabilities of the first switch SW1 and the second switch SW2 are completely consistent, the drain-source voltage of the first switch SW1 is equal to that of the second switch SW2. Therefore, the steady-state value of the voltage difference across the flying capacitor Cfly is Vfly=VOUT/2. That is, the present disclosure adaptively regulates the current-carrying capabilities of the first switch SW1 and the second switch SW2 in accordance with the magnitude of the power supply voltage VDD, ensuring that they operate in the saturation region. As a result, the voltage difference across the flying capacitor Cfly is stabilized at VOUT/2 and less affected by changes in the power supply voltage VDD. This allows the entire system to transition more smoothly during power supply voltage variations, resulting in higher stability.

It should be noted that, although devices are described in this text as certain N-channel or P-channel devices, or certain N-type or P-type doped regions, those skilled in the art can understand that complementary devices can also be implemented according to the present disclosure. Those skilled in the art can understand that the conductivity type refers to the mechanism of conduction, such as conduction by holes or electrons, and does not involve doping concentration but doping type, such as P-type or N-type. It should also be understood that the terms "during," "when," and "while" used in this text in relation to circuit operation are not strict terms indicating actions that occur immediately upon initiation of an action, but rather there may be some small but reasonable delays, such as various propagation delays, between the initiation of an action and the reaction it initiates. The terms "approximately" or "substantially" used in this text mean that the element value has parameters that are expected to be close to the declared value or position. However, as is well known in the art, there are always minor deviations that make it difficult for the value or position to be strictly the declared value. It has been appropriately determined in the art that a deviation of at least ten percent (10%) (and for semiconductor doping concentration, at least twenty percent (20%)) is a reasonable deviation from the described accurate ideal target. When used in conjunction with signal states, the actual voltage value or logic state of the signal (e.g., "1" or "0") depends on whether positive logic or negative logic is used.

Furthermore, it should be noted that relational terms such as first and second used in this text are merely used to distinguish one entity or operation from another, and do not necessarily imply any actual relationship or order between these entities or operations. Moreover, the terms "comprising," "including," or any other variants thereof are intended to cover non-exclusive inclusion, such that a process, method, item, or device comprising a series of elements not only includes those elements but also includes other elements not explicitly listed, or inherent elements of such process, method, item, or device. Unless otherwise limited, an element defined by the phrase "comprising a . . . " does not exclude the presence of additional identical elements in the process, method, item, or device that includes the element.

According to the embodiments of the present disclosure as described above, these embodiments do not exhaustively describe all the details, nor do they limit the invention to the specific embodiments described. It is apparent that many modifications and variations can be made in accordance with the above description. The embodiments have been selected and specifically described in this specification to better explain the principles of the present disclosure and its practical applications, thereby enabling those skilled in the art to fully utilize the present disclosure and its modifications in accordance with the invention. The scope of protection of the present disclosure should be defined by the claims of the present disclosure.

What is claimed is:

1. A charge pump circuit, comprising:

a first switch, having a control terminal that receives a driving voltage when a clock signal is in a first level state, and a substrate terminal that receives one of a power supply voltage and an output voltage;

a second switch, having a control terminal that receives the driving voltage when the clock signal is in a second level state, and a substrate terminal that receives the power supply voltage;

a flying capacitor, having a first end that receives the power supply voltage via the first switch, and a second end that receives the power supply voltage via the second switch, wherein when the first switch receives the driving voltage and turns on, the second switch turns off, allowing the power supply voltage to charge the flying capacitor, and when the second switch receives the driving voltage and turns on, the first switch turns off, allowing the flying capacitor to discharge to generate the output voltage, when the power supply voltage is less than a preset output voltage, the driving voltage provided to the first switch is less than the driving voltage provided to the second switch in at least one cycle of the clock signal.

2. The charge pump circuit according to claim 1, wherein when the power supply voltage is less than the preset output voltage, the substrate terminal of the first switch receives the output voltage; when the power supply voltage is greater than the preset output voltage, the substrate terminal of the first switch receives the power supply voltage.

3. The charge pump circuit according to claim 1, wherein when the power supply voltage is greater than the preset output voltage, the driving voltage provided to the first switch equals the driving voltage provided to the second switch in at least one cycle of the clock signal.

4. The charge pump circuit according to claim 3, further comprising:

an adjustment circuit, which provides an offset voltage when the power supply voltage is less than the preset output voltage and the first switch is turned on, and generates an amplified feedback signal in accordance with the output voltage and a reference voltage, and outputs the amplified feedback signal alone or the amplified feedback signal superimposed with the offset voltage as the driving voltage.

5. The charge pump circuit according to claim 4, wherein when the power supply voltage is less than the preset output voltage, the driving voltage provided to the first switch is the amplified feedback signal superimposed with the offset voltage, and the driving voltage provided to the second switch is the amplified feedback signal; when the power supply voltage is greater than the preset output voltage, the driving voltage is the amplified feedback signal.

6. The charge pump circuit according to claim 4, wherein the adjustment circuit comprises:

an offset unit, which provides the offset voltage when the power supply voltage is less than the preset output voltage and the first switch is turned on; and a feedback unit, which generates the amplified feedback signal in accordance with the output voltage and the reference voltage, and outputs the amplified feedback signal alone or the amplified feedback signal superimposed with the offset voltage as the driving voltage, wherein the feedback unit comprises:

a voltage divider, which samples the output voltage to obtain a divided voltage;

an error amplifier, coupled to the voltage divider, which generates the amplified feedback signal in accordance with the divided voltage and the reference voltage; and a buffer, having a first input terminal receiving the amplified feedback signal, a second input terminal being coupled to an output terminal of the buffer, and the output terminal further receiving the offset voltage.

7. The charge pump circuit according to claim 6, wherein the offset unit comprises:

a current source, having a first terminal receiving the power supply voltage; and a third switch and a fourth switch coupled in series between a second terminal of the current source and the output terminal of the buffer, wherein the third switch is turned on when the substrate terminal of the first switch receives the output voltage, and the fourth switch is turned on when the clock signal is in the first level state.

8. The charge pump circuit according to claim 2, wherein the preset output voltage is positively correlated with the reference voltage.

9. The charge pump circuit according to claim 1, further comprising:

a fifth switch, having a first terminal being coupled to the second end of the flying capacitor, and a second terminal being grounded;

a sixth switch, having a first terminal being coupled to the first end of the flying capacitor, and a second terminal providing the output voltage; and an output capacitor, being coupled between the output voltage and ground, wherein the fifth switch is turned on when the first switch is turned on, and the sixth switch is turned on when the second switch is turned on.

* * * * *